United States Patent
Montavoci et al.

(10) Patent No.: US 7,703,484 B2
(45) Date of Patent: Apr. 27, 2010

(54) METHOD AND DEVICE FOR FILLING A CONTAINER WITH A PREDETERMINED QUANTITY OF FLUID, FILLING MACHINE

(75) Inventors: Sandro Montavoci, Octeville sur Mer (FR); Franco Mutti, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 904 days.

(21) Appl. No.: 11/514,945

(22) Filed: Sep. 5, 2006

(65) Prior Publication Data
US 2007/0074780 A1    Apr. 5, 2007

(30) Foreign Application Priority Data
Sep. 13, 2005  (EP) .................................. 05291887

(51) Int. Cl.
*B65B 1/30* (2006.01)
*B67D 5/08* (2006.01)
*A01G 25/00* (2006.01)

(52) U.S. Cl. .............................. 141/196; 141/2; 141/94; 141/192; 222/55; 222/56; 222/59; 239/63.5

(58) Field of Classification Search .................. 141/2, 141/83, 94, 95, 192, 196, 198; 222/52, 55, 222/56, 59, 504; 239/63.5, 318
See application file for complete search history.

(56) References Cited

U.S. PATENT DOCUMENTS

| | | | |
|---|---|---|---|
| 4,842,162 A | * | 6/1989 | Merkel ........................... 222/1 |
| 5,878,992 A | | 3/1999 | Edwards et al. |
| 6,527,142 B1 | * | 3/2003 | Ikushima ...................... 222/61 |
| 6,679,685 B2 | * | 1/2004 | Maruyama et al. .......... 417/374 |
| 6,729,507 B2 | * | 5/2004 | Nagahata et al. ............. 222/504 |
| 7,178,704 B2 | * | 2/2007 | Saidman ...................... 222/504 |

FOREIGN PATENT DOCUMENTS

FR    2 785 598    5/2000

OTHER PUBLICATIONS

Patent Abstracts of Japan, vol. 1997, No. 10, Oct. 31, 1997 & JP 09 156697 A (Mitsubishi Heavy Ind Ltd), Jun. 17, 1997.

* cited by examiner

Primary Examiner—Timothy L Maust
(74) Attorney, Agent, or Firm—Sughrue Mion, PLLC

(57) ABSTRACT

A device includes a nozzle (14) for delivering a fluid flow into a container (12), a valve (16) having a movable valve member (27) for controlling the fluid flow, a member (54) for sending a position control signal to the movable valve member (27), such that the movable valve member (28) is expected to follow an expected displacement vs. time curve which adjusts the quantity of fluid delivered into the container (12) to the predetermined quantity. The device further includes a sensing element (56) for sensing a point of the actual displacement vs. time curve followed by the movable valve member (27) in response to the position control signal, and a comparing element (58) for comparing the sensed point to the corresponding point of the expected displacement vs. time curve.

20 Claims, 3 Drawing Sheets

METHOD AND DEVICE FOR FILLING A CONTAINER WITH A PREDETERMINED QUANTITY OF FLUID, FILLING MACHINE

The invention relates to a method for filling a container a device thereof and a filling machine.

It is known to fill a container with a predetermined quantity of fluid by using a device comprising a nozzle for delivering a fluid flow into the container, and a valve comprising a movable valve member for controlling the fluid flow.

A known method achieved by such device comprises the step of sending a position control signal to the movable valve member, such that said movable valve member is expected to follow an expected displacement vs. time curve which adjusts the quantity of fluid delivered into the container to the predetermined quantity.

Such method is for instance disclosed in JP-A-9-156697.

The expected displacement vs. time curve of the valve member is determined by tests, often carried out during calibration of the device. The position control signal is then derived so that the valve member follows this displacement vs. time curve.

A filling machine comprises several similar filling devices, usually between four and one hundred fifty. Since the position control signal can be applied to every device, the method is a cheap way to fill containers.

However, the known method is based on a basic hypothesis of identical filling devices, which is never actually realised.

Moreover, the response of a valve member to a given control signal may degrade in time, e.g. due to wear. In such case, the position control signal may lead to delivering a wrong quantity of fluid.

The invention aims to overcome the previous problems by providing a method for filling a container according to claim 1. Other features of the method are recited in the dependent claims 2 to 9.

The invention further provides a device for filling a container according to claim 10. Other features of the device are recited in the dependent claims 11 to 14.

The invention further provides a filling machine according to claim 15.

In the following, the invention will be described in detail by way of example with reference to the accompanying drawings, in which.

In the following description, the terms "above", "under", "high", "low", etc., refer to a vertical axis X along which the container and the filling device generally extend, and along which the fluid flows from the filling device to the container. The container is placed below the filling device.

Figure 1:
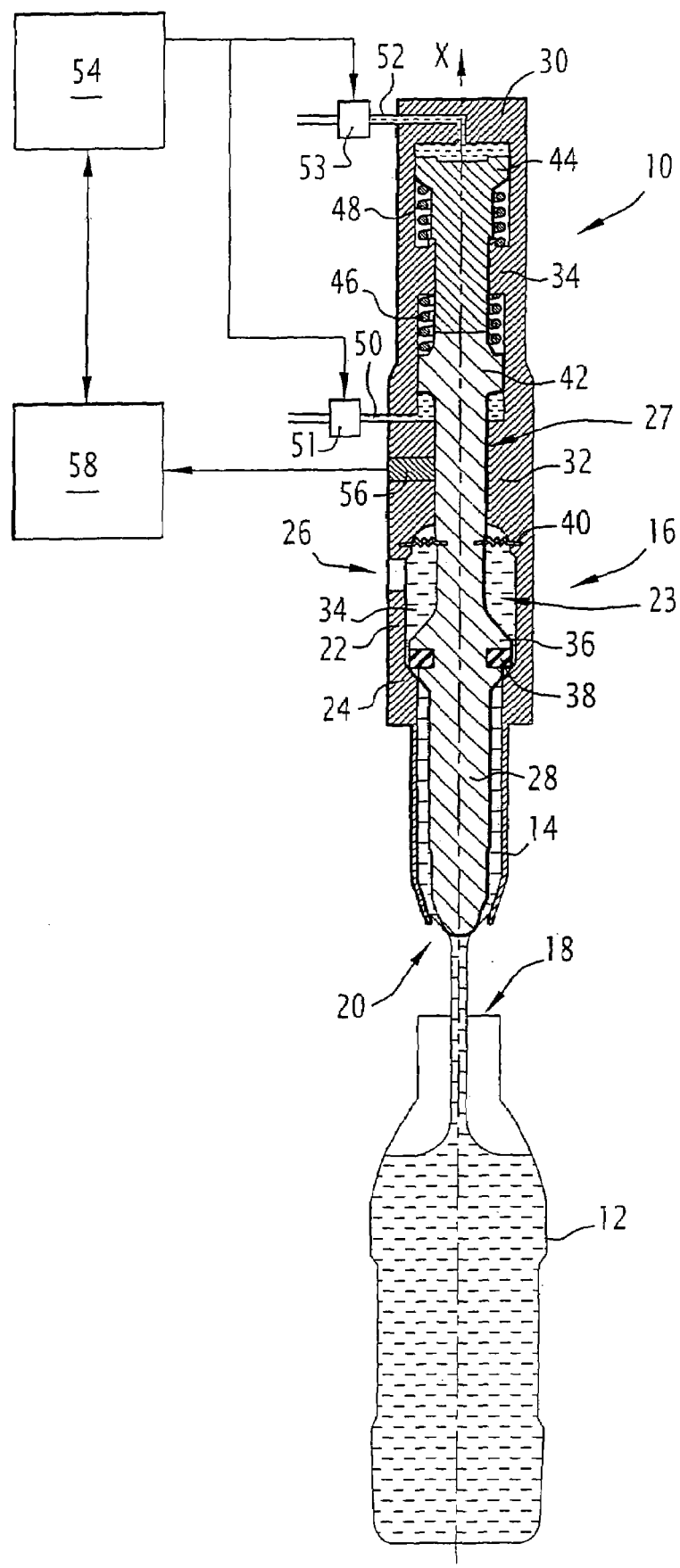
FIG. 1 is a cross-sectional view of a device for filling a container according to the invention.

The filling device illustrated in FIG. 1 is designated by numeral reference 10. It is intended to fill a container 12, in this case a bottle, with a fluid that can be water or any kind of liquid.

The filling device 10 comprises a nozzle 14 for delivering a fluid flow into the container 12 along the vertical X axis, and a valve 16 for controlling the fluid flow through the nozzle 14.

The nozzle 14 has the shape of a vertical tube disposed above an aperture 18 of the container 12. The diameter of the tube decreases near its lower end 20 that faces the aperture 18.

The valve 16 comprises an outer casing 22 extending the nozzle 14 upwardly, in such a way that the casing 22 and the nozzle 14 define together an elongated vertical cavity 23 along the X axis. The casing is in one piece with the nozzle 14.

The casing 22 comprises an inner shoulder 24 extending from the casing 22 in the cavity 23 and facing upwards.

An aperture 26 for the supply of fluid is arranged on a side of the casing 22 and opens in an uppermost portion of cavity 23.

A movable valve member 27 extends in the cavity 23, i.e. within the nozzle 14 and the casing 22. It extends from the lower end 20 of the nozzle 14 to a top lid 30 of the casing 22.

The movable valve member 27 is positioned thanks to a lower guiding portion 32 and an upper guiding portion 34, both arranged in the casing 22 above the shoulder 24 and spaced there from.

The movable valve member 27 comprises a principal lower portion consisting of a plunger 28 intended to control the fluid flow. To this end, the plunger 28 comprises a radial outer flange 36 with a radial annular sealing gasket 38. The radial outer flange 36 is located between the shoulder 24 and the lower guiding portion 32 of the casing 22. The gasket 38 is intended to sealingly engage the shoulder 24 of the casing 22 to prevent fluid flow through the nozzle 14. In such case, the plunger 28 is said to be in its closed position.

An annular flexible diaphragm 40 is attached to the casing 22 and to the plunger at the top portion of cavity 23 so as to prevent the fluid to reach the lower guiding portion 32.

In order to operate the movable valve member 27 so as to place the plunger 28 it incorporates in an appropriate position for controlling the flow, the movable valve member 27 also comprises an upper portion including lower and upper operating pistons 42, 44. This upper portion is fixed to or made integral with the top of the plunger 28. The lower piston 42 slides vertically between the two guiding portions 32, 34 of the casing 22, while the upper piston 44 slides vertically between the upper guiding portion 34 and the top lid 30.

The movable valve member 27 is also operated by two springs 46, 48 and two ducts 50, 52 arranged in the casing 22 for introducing pressurised air. Spring 46 is stronger than spring 48. Both springs 46, 48 and ducts 50, 52 are identified by their vertical position.

More precisely, the lower piston 42 is biased downwardly by a lower spring 46 compressed between the lower piston 42 and the upper guiding portion 34, and upwardly by pressurised air introduced through the lower duct 50 between the lower guiding portion 32 and the lower piston 42.

The lower duct 50 is controlled by a lower air valve 51.

Similarly, the upper piston 44 is biased upwardly by a upper spring 48 compressed between the upper piston 44 and the upper guiding portion 34, and downwardly by pressurised air introduced through the upper duct 52 between the upper guiding portion 34 and the top lid 30.

The upper duct 52 is controlled by a upper air valve 53.

When the lower duct 50 is solely used, the valve 16 behaves as a two-position valve. The movable valve member 27 is able to take a first stable position, i.e. the closed position of the plunger 28 described previously, in which the plunger 28 prevents fluid flow through the nozzle 14, and a second stable position, called open position, in which the plunger 28 allows the fluid to flow at a maximum flow rate through the nozzle 14.

When both the lower duct 50 and the upper duct 52 are used, the valve 16 behaves as a three-position valve. In such case, the movable valve member 27 is able to take a further intermediate position, such that the plunger 28 allows the fluid to flow at an intermediate flow rate, less than the maximum flow rate.

Each of these positions corresponds to a vertical position of the movable valve member 27 and hence of the plunger 28 along the vertical axis X.

The filling device 10 further comprises a means 54 for storing and sending a position control signal for the movable valve member 27, by operating the air valves 51, 53. The position control signal is such that the plunger 28 is expected to follow an expected displacement vs. time curve which adjusts the quantity of fluid delivered into the container 12 to the predetermined quantity. The position control signal is further described below in reference with FIGS. 2A, 2B, 3A and 3B.

The filling device 10 also comprises a sensing means 56 for sensing a point on the actual displacement vs. time curve followed by the movable valve member 27 and, hence, by the plunger 28 in response to the position control signal. The sensing means 56 may comprise a magnetic, mechanical, optic, electrical, electronic or inductive sensor. It can be located in the lower guiding portion 32 as shown on the figures, or at any other convenient places, e.g. on the top of the filling device, with or without contact with the movable valve member 27. The location of the sensing means 56 depends from the type of filling device used.

Comparing means 58 for comparing the sensed point to the expected point of the movable valve member 27 is also provided. The comparing means 58 is able to modify the position control signal stored in the means 54.

The filling device 10 described above is integrated into a filling machine (not shown) that comprises several theoretically identical filling devices.

The filling machine may also comprise at least one additional modified filling device, similar to the filling device 10, except that it comprises neither the means 54 for storing and sending position control signals, nor the comparing means 58. Instead, it comprises a means for measuring the fluid flow delivered into a corresponding additional container, and a means for sending an additional position control signal to its plunger, the additional position control signal being responsive to the measured fluid flow, to adjust the quantity of fluid delivered into container to the predetermined quantity.

The additional modified filling device further comprises a means for deriving said expected displacement vs. time curve from said additional position control signal.

Figure 2A:
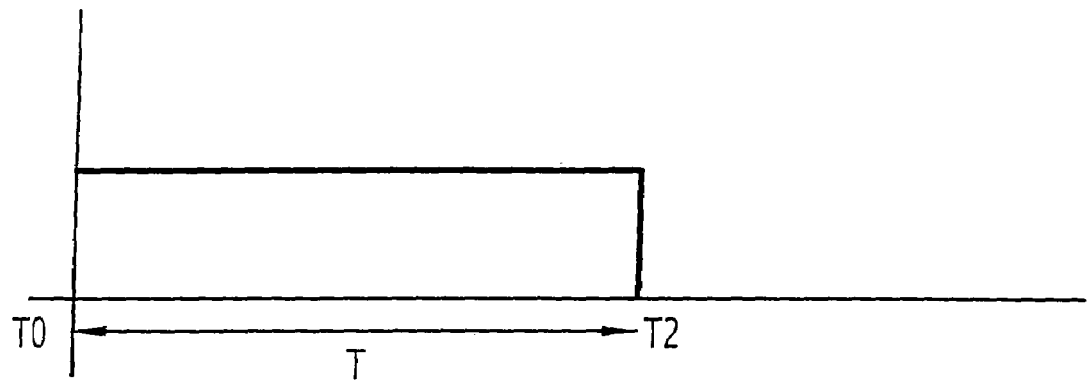
FIGS. 2A, 2B and 3A, 3B illustrate signals for controlling the filling device of FIG. 1, and the expected response of the device.

An example of position control signal is shown on FIG. 2A, when the valve 16 is used as a two-position valve. In such case, the position control signal comprises a step signal starting from a time T0, at which the filling of the container 12 begins, and ending at a time T2. The signal causes the lower air valve 51 to be opened between time T0 and time T2.

The step signal therefore constitutes a time segment with a predetermined duration controlling the movable valve member 27 to occupy the stable open position of the plunger 28.

Figure 2B:
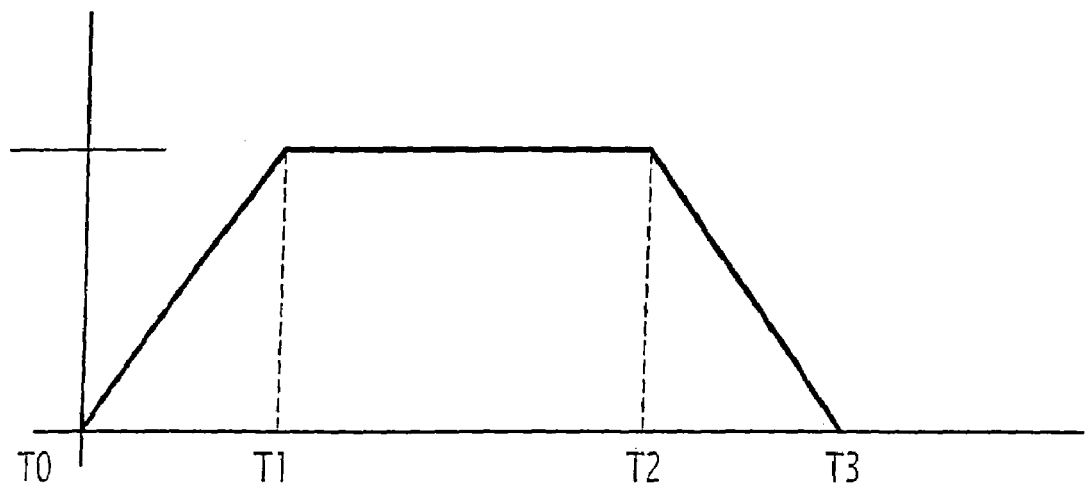

A possible expected displacement vs. time curve of the movable valve member 27, which corresponds to that of the plunger 28, is shown on FIG. 2B. At time T0, the plunger 28 is at its closed position. From time T0 to a time T1, the movable valve member 27 is expected to move up, under the action of pressurised air, until the plunger 28 reaches its open position at time T1. The movable valve member 27 stays in this position until time T2. From time T2 to a time T3, the movable valve member 27 is expected to move down, under the action of the lower spring 46, until the plunger 28 reaches back its closed position at time T3.

Figure 3A:
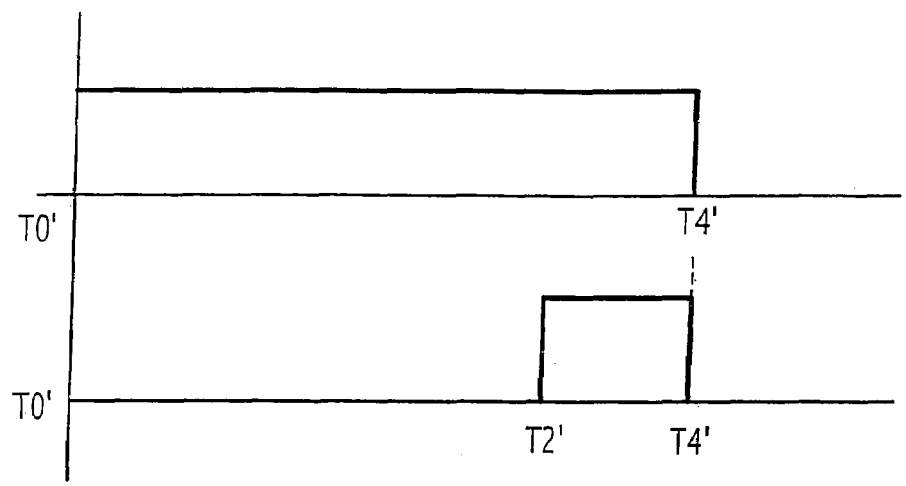

Similarly, an example of position control signal is shown on FIG. 3A, when the valve 16 is used as a three-position valve. In that case, the position control signal comprises two components, one for each air valve 51, 53.

The component for the lower air valve 51 is similar to the position control signal of FIG. 2A, that is to say a step signal from a time T0' to a time T4'.

The component for the upper air valve 53 is a step signal starting from a time T2', subsequent to time T0', and ending at time T4'.

The position control signal then comprises two time segments, between T0' and T2', and between T2' and T4', each with a predetermined duration and each controlling the movable valve member 27 and, hence, the plunger 28, to occupy a respective stable position.

Figure 3B:
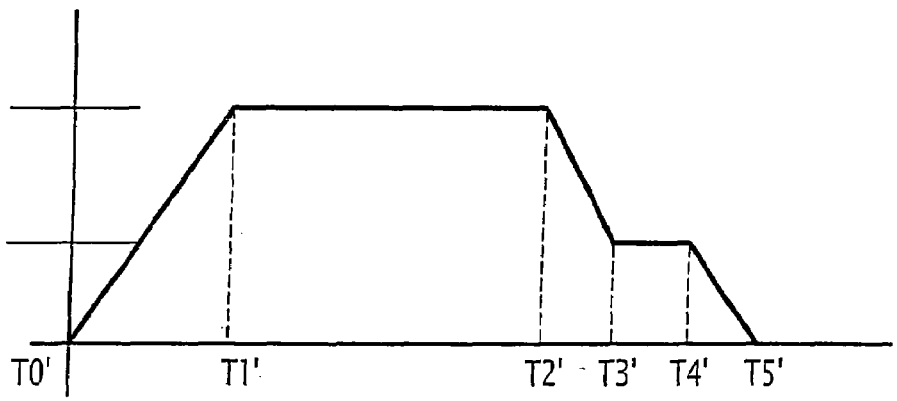

The expected displacement vs. time curve of the movable valve member 27, which corresponds to that of the plunger 28, is shown on FIG. 3B. At time T0', the plunger 28 is at its closed position. From time T0' to a time T1', the movable valve member 27 is expected to move up, under the action of pressurised air introduced by the lower duct 50, until the plunger 28 reaches its open position at time T1'. Starting from time T2', the movable valve member 27 is expected to slightly move down, because of the introduction of pressurised air in the upper duct 52. The plunger 28 then reaches its intermediate position at a time T3'. The movable valve member 27 stays until time T4'. From time T4' to a time T5', the movable valve member 27 is expected to move down, under the action of the lower spring 46, until the plunger 28 reaches back its closed position at time T5'.

Figure 4:
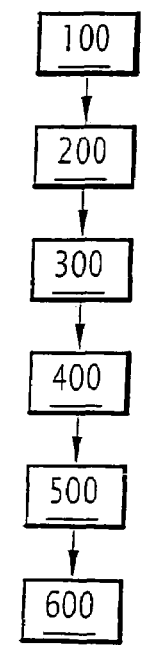
FIG. 4 is a block diagram of a filling method achieved by the filling device of FIG. 1.

Referring now to FIG. 4, the filling method comprises a first step 100 of deriving a relation between the position control signal and the flow of fluid through the nozzle 14. This is achieved by determining a relation between the position control signal and an expected response of the movable valve member 27 and, hence, of the plunger 28, for instance its vertical position along the X axis, and a relation between the position of the movable valve member 27 and, hence, of the plunger 28 and the flow of fluid through the nozzle 14. To improve the method, the flow of fluid being a function of an inlet hydrostatic pressure at the supply aperture 26, a curve describing the fluid flow vs. the inlet hydrostatic pressure can be defined from experiments, and introduced in the previous calculations. These relations can be derived either theoretically or by experience, for example with the help of the above-mentioned modified filling device.

The method then comprises a second step 200 of determining the position control signal of FIG. 2A or 3A, depending on the number of positions used by the valve 16, by using the results of the first step 100.

In both cases, the times defining the position control signal are determined so that the area under the expected response curve corresponds to the predetermined quantity of fluid, at a given inlet hydrostatic pressure if such parameter is used.

The adequate position control signal is then sent to the air valves 51, 53 in a third step 300.

In a fourth step 400, a point of the actual displacement vs. time curve of the movable valve member 27 responsive to the position control signal is sensed by the sensing means 56. This is achieved by measuring the time at which the movable valve member 27 and, hence, the plunger 28 has reached at least one predetermined position. Preferably, the stable positions are used, which leads to measure times $T1_{mes}$ and $T3_{mes}$, or times $T1'_{mes}$, $T3'_{mes}$ and $T5'_{mes}$.

The method further comprises a fifth step 500 of comparing the sensed points to the corresponding expected points of the curve. To this end, the measured times are compared with the expected times at which the movable valve member 27 should have reached the predetermined positions according to the expected displacement vs. time curve. That is to say, $T1_{mes}$ mes and $T3_{mes}$ are compared to T1 and T3, or $T1'_{mes}$, $T3'_{mes}$ and $T5'_{mes}$ are compared to T1', T3' and T5'.

Then, if the comparison shows a difference between expected and measured times higher than a predetermined threshold, mathematically related to the inlet hydrostatic pressure, the method goes on with a sixth step 600 of modifying the position control signal, for the filling of a next container 12. The modification consists in changing the times defining the position control signal, that is to say the duration of the time segments, so that the movable valve member 27 follows again the expected displacement vs. time curve.

As an alternative, an alarm generating means (not shown) is also provided and the step of modifying the position control signal is replaced or completed by a step of generating an alarm signal responsive to the comparison.

In another embodiment, the sensing step 400 is achieved by sensing at least one actual position of the movable valve member 27 at at least one respective predetermined time.

In such case, the fifth step 500 is achieved by comparing the sensed actual position to an expected position that the movable valve member 27 should occupy at the predetermined time according to the expected displacement vs. time curve.

In still another embodiment, the actual position of the movable valve member 27 is continuously sensed at step 400 so as to determine its actual continuous displacement vs. time curve. The actual continuous displacement vs. time curve is then compared to the expected displacement vs. time curve at step 500.

As it is apparent from the previous description, the invention is applicable to any kind of filling device comprising a movable valve member, provided that it is possible to measure the movements of the valve member.

The invention claimed is:

1. Method for filling a container (12) with a predetermined quantity of fluid, by means of a filling device (10) comprising:
   a nozzle (14) for delivering a fluid flow into the container (12), and
   a valve (16) comprising a movable valve member (27) for controlling the fluid flow, the method comprising the step (300) of sending a position control signal for the movable valve member (27), such that said movable valve member (27) is expected to follow an expected displacement vs. time curve which adjusts the quantity of fluid delivered into the container (12) to the predetermined quantity, and the method being characterized in that it comprises the steps of:
   sensing (400) a point at the actual displacement vs. time curve followed by the movable valve member (27) in response to the position control signal, and
   comparing (500) the sensed point to the corresponding point of the expected displacement vs. time curve.

2. Method according to claim 1, characterized in that:
   the sensing (400) is achieved by measuring the time at which the movable valve member (27) has reached a predetermined position, and
   the comparison (500) is achieved by comparing the measured time with the expected time at which the movable valve member (27) should have reached the predetermined position according to the expected displacement vs. time curve.

3. Method according to claim 2, characterized in that the predetermined position corresponds to a stable position of the movable valve member (27), called open position, in which the movable valve member allows the fluid to flow at a maximum flow rate through the nozzle (14).

4. Method according to claim 1, characterized in that:
   the sensing (400) is achieved by sensing an actual position of the movable valve member (27) at a predetermined time, and
   the comparison (500) is achieved by comparing the sensed actual position to an expected position that the movable valve member (27) should occupy at the predetermined time according to the expected displacement vs. time curve.

5. Method according to claim 1, characterized in that it comprises the step (600) of modifying the position control signal responsive to the comparison.

6. Method according to claim 5, characterized in that:
   the position control signal comprises at least one time segment with a predetermined duration, said time segment controlling the movable valve member (27) to occupy a stable position, and
   said modifying step comprises changing the duration of the time segment.

7. Method according to claim 5, characterized in that said modification step is achieved for the filling of a next container (12).

8. Method according to claim 1, characterized in that it comprises the step (600) of generating an alarm signal responsive to said comparison when the difference between said sensed and expected points exceeds a predetermined threshold.

9. Method according to claim 1, characterized in that the expected displacement vs. time curve is determined as a function of an inlet hydrostatic pressure of the fluid at a fluid inlet aperture (26) of the nozzle (14).

10. Method according to claim 2, characterized in that it comprises the step (600) of modifying the position control signal responsive to the comparison.

11. Method according to claim 3, characterized in that it comprises the step (600) of modifying the position control signal responsive to the comparison.

12. Device according to claim 1, characterized in that it comprises a comparing means (58) for modifying the position control signal responsive to the comparison.

13. Device for filling a container (12) with a predetermined quantity of fluid, comprising:
   a nozzle (14) for delivering a fluid flow into the container (12),
   a valve (16) comprising a movable valve member (27) for controlling the fluid flow,
   a means (54) for sending a position control signal for the movable valve member (27), such that said movable valve member (27) is expected to follow a course in time which adjusts the quantity of fluid delivered into the container (12) to the predetermined quantity,
characterized in that it comprises:
   a sensing means (56) for sensing a point of the actual displacement vs. time curve followed by the movable valve member (27) in response to the position control signal, and
   a comparing means (58) for comparing the sensed point to the corresponding point of the expected displacement vs. time curve of the movable valve member (27).

14. Device according to claim 13, characterized in that:
   the sensing means (56) is adapted to measure the time at which the movable valve member (27) has reached a predetermined position, and
   the comparing means (58) is adapted to compare the measured time with the expected time at which the movable valve member (27) should have reached the predetermined position according to the expected displacement vs. time curve.

15. Device according to claim 14, characterized in that the predetermined position corresponds to a stable position of the movable valve member (27), called open position, in which the movable valve member allows the fluid to flow at a maximum flow rate through the nozzle (14).

16. Device according to claim 13, characterized in that:
the sensing means (56) is adapted to sense an actual position of the movable valve member (27) at a predetermined time, and
the comparing means (58) is adapted to compare the sensed actual position to an expected position that the movable valve member (27) should occupy at the predetermined time according to the expected displacement vs. time curve.

17. Device according to claim 13, characterized in that it comprises a comparing means (58) for modifying the position control signal responsive to the comparison.

18. Device according to claim 13, characterized in that the movable valve member (27) comprises a plunger (28) sliding longitudinally in the nozzle (14) between at least a first stable position, called closed position, in which the plunger (28) prevents fluid flow through the nozzle (14), and a second stable position, called open position, in which the plunger (28) allows the fluid to flow at a maximum flow rate through the nozzle (14), and in that the sensing means (56) is adapted to sense a point on an actual longitudinal displacement vs. time curve followed by the plunger (28) with respect to the nozzle (14).

19. Filling machine characterized in that it comprises:
a plurality of filling devices according to claim 13,
at least one additional filling device comprising:
an additional nozzle for delivering a fluid flow into an additional container,
an additional valve comprising an additional movable valve member for controlling the fluid flow through said additional nozzle,
a means for measuring the fluid flow delivered into the additional container through said additional nozzle, and
an additional means for sending an additional position control signal to the additional movable valve member responsive to the measured fluid flow to adjust the quantity of fluid delivered into the additional container through said additional nozzle to the predetermined quantity, and
means for deriving said expected displacement vs. time curve from said additional position control signal.

20. Device according to claim 15, characterized in that it comprises a comparing means (58) for modifying the position control signal responsive to the comparison.

* * * * *